Figure 1:
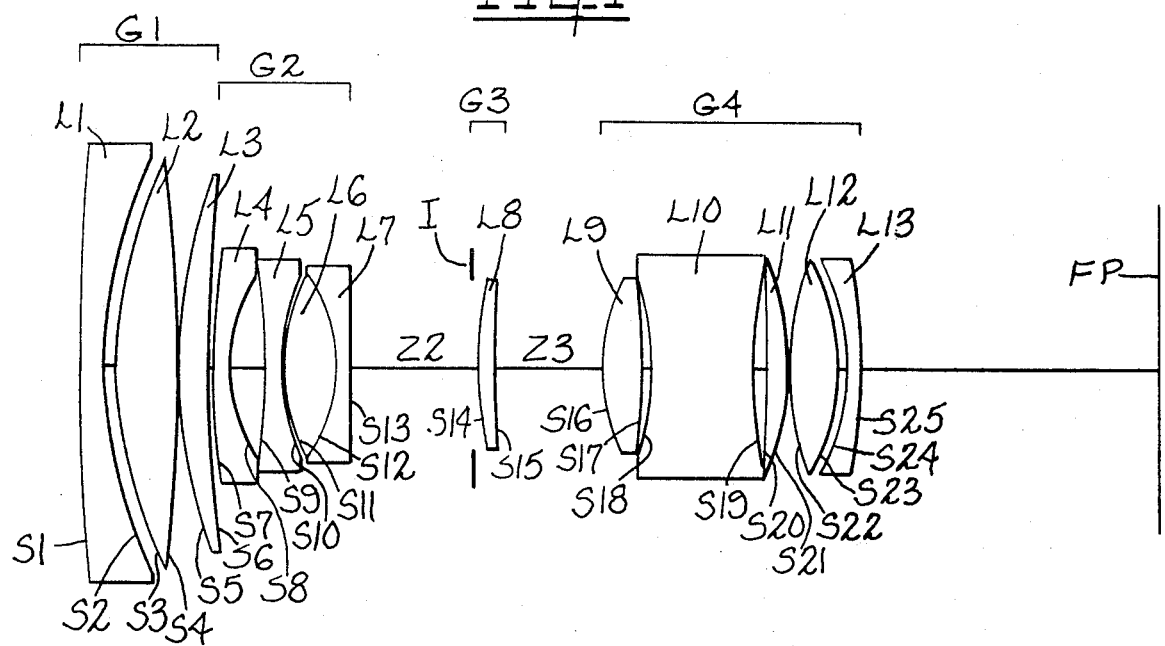

350-423
3/17/81    OR    4,256,381    SR

United States Patent [19]
Kreitzer

[11] 4,256,381
[45] Mar. 17, 1981

[54] ZOOM LENS

[75] Inventor: Melvyn H. Kreitzer, Cincinnati, Ohio

[73] Assignee: Vivitar Corporation, Santa Monica, Calif.

[21] Appl. No.: 117,369

[22] Filed: Jan. 31, 1980

[51] Int. Cl.³ .................................................. G02B 15/14
[52] U.S. Cl. .................................... 350/423; 350/450
[58] Field of Search ........................ 350/184, 186, 207

[56]  References Cited
U.S. PATENT DOCUMENTS

| | | | |
|---|---|---|---|
| 3,501,224 | 3/1970 | Takahashi | 350/184 |
| 3,840,290 | 10/1974 | Betensky et al. | 350/184 |
| 3,918,797 | 11/1975 | Takano | 350/186 |
| 3,961,845 | 6/1976 | Doi et al. | 350/184 |
| 3,975,089 | 8/1976 | Betensky | 350/184 |
| 4,149,774 | 4/1979 | Hirano | 350/184 |
| 4,172,635 | 10/1979 | Ogino | 350/184 |

FOREIGN PATENT DOCUMENTS
363501  9/1962  Switzerland.

*Primary Examiner*—Conrad J. Clark
*Attorney, Agent, or Firm*—DeLio and Montgomery

[57]  ABSTRACT

A lens of variable equivalent focal length where two lens groups located on either side of an aperture defining means move relative to the aperture defining means, and a lens group of positive power is positioned close to the aperture defining means. The aperture defining means and the associated positive power group may either be stationary or move with change in equivalent focal length.

31 Claims, 5 Drawing Figures

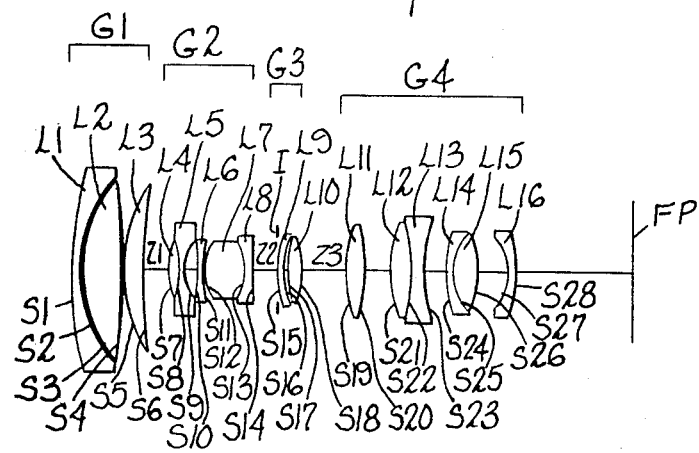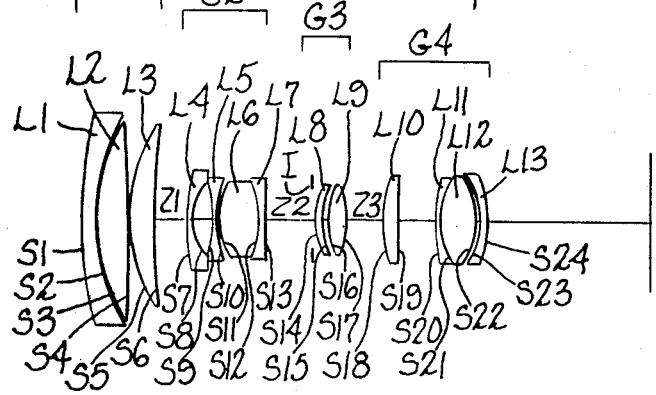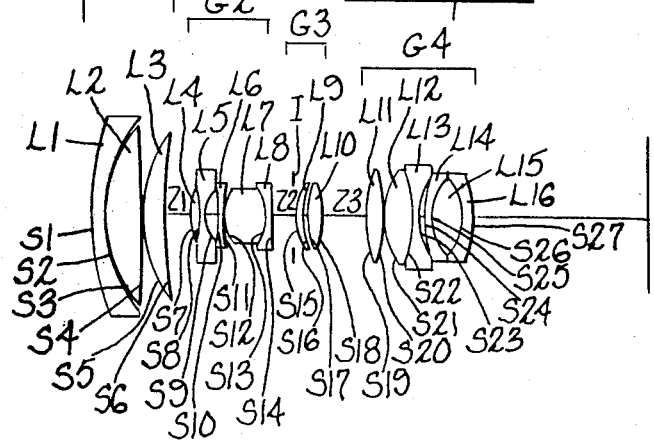

ZOOM LENS

This invention relates to zoom lenses, and more particularly relates to such lenses having a range of equivalent focal lengths which subtend the dimension of the diagonal of the image plane of the lens.

A lens having an equivalent focal length less than the diagonal of its image plane may be classified as a wide angle lens. Zoom lenses which have a range from wide angle to a long focus or so-called telephoto equivalent focal length (EFL) present different design criteria when considered from the extremes of the EFL's.

A wide angle lens of about 70° field is not difficult to design. Such design generally includes a negative front group and a positive rear group where the back focal length of the lens is greater than the EFL. Such lens is often termed a retrofocus or reverse telephoto lens. An example of an excellent optic of this category is shown in U.S. Pat. No. 4,099,849 and is marketed as a Vivitar Series I, 28 mm f/1.9 lens. On the other hand, lenses having an EFL several times the diagonal of the image frame present other design considerations. Examples of a well corrected telephoto lens are given in U.S. Pat. No. 3,942,876, and have been marketed as Vivitar Series I lenses a 135 mm f/2.3, and 200 mm f/3.0. A comparison of such lens shows completely different design configurations and considerations.

Where the EFL range of a zoom lens is to cross the so-called wide angle definition, a more sophisticated lens design is demanded requiring more lens elements and movements of various lens groups. An example is shown in U.S. Pat. No. 3,975,089, and has been marketed as a Vivitar Series I 35–85 mm f/2.8 lens.

Few zoom lenses have been designed and marketed having a lower EFL in the wide angle range and having a zoom range of greater than 3:1, and then the actual EFL extremities are subject to a five percent marking tolerance. In such zoom lenses, the spherical abberrations become excessive as the longer EFL is attempted to be increased and/or attempt is made to increase the relative aperture.

Without size and cost constraints, these problems can be overcome by any experienced optical designer. However, there are presently few, if any, commercially acceptable zoom lenses, from the standpoint of compact size, relative aperture, zoom range, and good quality available from a wide angle range with a rated zoom range of three to one or over for the 24×36 mm image frame format.

However, Ellis I. Betensky in U.S. Patent Application Ser. No. 070,749 has disclosed a new configuration for a zoom lens which permits a zoom range of almost five to one from a field angle of over seventy degrees. Such lenses comprise a front positive group, a strong negative second group, a third positive group and in some cases, a fourth positive group. Three of these groups may be movable to vary the EFL of the lens.

The present invention provides an improvement over and to the foregoing Betensky lens in that it permits a larger aperture for a given physical size of the lens, or alternatively a reduction in physical size for a given relative aperture.

Briefly stated, the invention provides a zoom lens comprising a front positive group, a second negative group and a rear positive group in which a positive power lens group is positioned very closely adjacent the aperture defining means between the second and rear groups. The lens and aperture defining means may be stationary, or may move in fixed spaced relation as the EFL is varied. This positive optical power at the aperture permits a larger relative aperture by alleviating the limiting factor of spherical aberration at the longer EFL's. The positive component reduces the marginal ray height of the ray bundle at and past the aperture defining means. The optical power of this positive group is related to other parameters of the lens as hereinafter described.

A first embodiment of a lens embodying the invention comprises a first positive group, a second negative group, the aperture defining means followed by a third positive group in fixed relation to the aperture defining means, and a fourth positive group. During variation of focal length, the first and fourth groups move simultaneously in one direction and the second group moves in the opposite direction; for focusing all groups move in fixed relation. In a another embodiment of the invention, the aperture defining means and the third group move in fixed relation, and only the first group moves for focusing.

An object of this invention is to provide a new and improved zoom lens of the type described of compact size and/or large relative aperture.

Figure 1A:
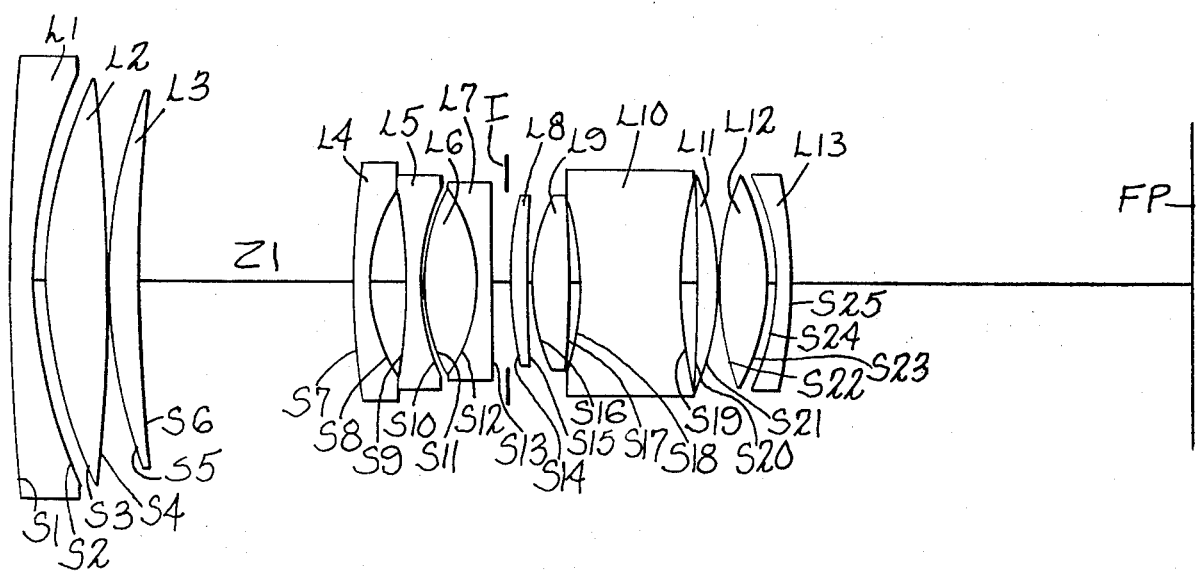

The features of the invention which are believed to be novel are particularly pointed out and distinctly claimed in the concluding portion of this specification. However, the invention both as to its organization and operation together with further objects and advantages thereof may best be appreciated by reference to the following detailed description taken in conjunction with the drawings, in which:

FIGS. 1 and 1a are schematic side elevations of one lens form embodying the invention; and FIGS. 2, 3, and 4 are schematic side elevations of other embodiments of the invention.

A lens embodying the invention as shown in FIGS. 1 and 1a comprises from the object end thirteen elements L1-L13 in four Groups G1-G4.

Group G1 comprises a negative meniscus L1, a biconvex element L2, a positive meniscus L3, and is of overall positive power.

Group G2 comprises a negative meniscus L4, a biconcave element L5, and a relatively thick positive doublet shown as a biconvex element L6, and a negative element L7. The doublet L6, L7 is convex to the object and has a large radius image side surface which may be convex or concave to the image as shown by the prescriptions, infra.

Group G3, as shown in FIG. 1, comprises a single element L8 very closely spaced to the aperture defining means or iris I. Component L8 is convex to the object and has an image side surface defined on a very large radius $R_I$ relative to the object side radius $R_o$.

Group G4 comprises a biconvex element L9, a relatively thick biconcave element L10, a positive meniscus L11 convex to the image, a biconvex element L12, and a negative meniscus convex to the image.

As will hereinafter be made apparent, the third group bears a certain relationship to other parameters of the lens:

$$0.3 > (K_3/K_G Z_R) > 0.15$$

where $K_3$ is the optical power of the group G3
$Z_R$ is the zoom ratio of the lens, and $K_G$ is the geometric mean power of the lens, and
$K_G = \sqrt{K_L K_S}$
where $K_L$ is the power of the lens at the longest equivalent focal length, and $K_S$ is the power of the lens at the shortest equivalent focal length.

Three examples of the lenses substantially as shown in FIGS. 1 and 1a are set forth in Tables I–III. In these examples and as shown in FIGS. 1 and 1a, groups G1 and G4 move together toward the object as the EFL increases, group G2 moves toward the image and group G3 and the aperture defining means remains stationary with respect to the focal plane FP.

In the following three examples, the prescriptions are for lenses having a 24×36 mm image frame; an equivalent focal length (EFL) range of 28.6 mm to 87.0 mm; and relative apertures which vary from f/2.9 to f/3.9 from the lower EFL to the higher EFL.

In Tables I–III, the lens elements are identified from the object to the image end by L1–L13, the lens element surfaces are S1–S25, the index of refraction is $N_D$, and the lens element dispersion as measured by the Abbe Number is $V_D$. The movements of the various groups are shown by the data under the heading Zoom Data for various EFL's. Z1, Z2 and Z3 are the axial spaces between groups as shown on the drawings. FVD is the front vertex distance of the lens, and BFL is the back focal length of the lens. The relative aperture at the various EFL's is given under the heading f/No.

TABLE I

| Lens | Surface | Surface Radius (mm) | Axial Distance Between Surfaces (mm) | $N_d$ | $V_d$ |
|---|---|---|---|---|---|
| L1 | S1 | 878.67 | | | |
|  | S2 | 53.00 | 3.00 | 1.805 | 25.5 |
| L2 | S3 | 54.94 | 1.80 | | |
|  | S4 | −295.19 | 8.70 | 1.786 | 43.9 |
| L3 | S5 | 49.87 | 0.15 | | |
|  | S6 | 100.18 | 4.30 | 1.835 | 43.0 |
|  |  |  | Z1 | | |
| L4 | S7 | 83.91 | | | |
|  | S8 | 17.34 | 2.00 | 1.850 | 32.2 |
| L5 | S9 | −116.10 | 4.80 | | |
|  | S10 | 33.18 | 2.00 | 1.835 | 43.0 |
| L6 | S11 | 25.25 | 0.20 | | |
|  | S12 | −17.23 | 11.54 | 1.728 | 28.3 |
| L7 | S13 | −826.07 | 1.50 | 1.835 | 43.0 |
|  |  |  | Z2 | | |
|  | aperture |  | 1.00 | | |
| L8 | S14 | 55.92 | 2.23 | 1.667 | 48.3 |
|  | S15 | 1165.66 | | | |
|  |  |  | Z3 | | |
| L9 | S16 | 28.44 | 4.79 | 1.613 | 58.6 |
|  | S17 | −41.59 | 0.79 | | |
| L10 | S18 | −28.11 | 12.00 | 1.593 | 35.5 |
|  | S19 | 38.61 | 2.68 | | |
|  | S20 | −145.85 | | | |

TABLE I-continued

| Lens | Surface | Surface Radius (mm) | Axial Distance Between Surfaces (mm) | $N_d$ | $V_d$ |
|---|---|---|---|---|---|
| L11 | S21 | −31.12 | 3.00 | 1.835 | 43.0 |
|  | S22 | 51.53 | 0.20 | | |
| L12 | S23 | −23.68 | 5.97 | 1.573 | 42.6 |
|  | S24 | 21.43 | 0.99 | | |
| L13 | S25 | −993.13 | 1.60 | 1.805 | 25.5 |

ZOOM DATA

| f/No | EFL | FVD | Z1 | Z2 | Z3 | BFL |
|---|---|---|---|---|---|---|
| 2.9 | 28.6mm | 156.4mm | .80 mm | 15.3mm | 14.7mm | 43.6 |
| 3.2 | 40.0 | 161.3 | 10.4 | 10.4 | 10.3 | 48.5 |
| 3.5 | 55.0 | 165.0 | 18.6 | 6.5 | 6.0 | 53.1 |
| 3.9 | 87.0 | 171.7 | 29.2 | 1.0 | 0.8 | 58.9 |

TABLE II

| Lens | Surface | Surface Radius (mm) | Axial Distance Between Surfaces (mm) | $N_d$ | $V_d$ |
|---|---|---|---|---|---|
| L1 | S1 | 649.67 | 3.00 | 1.805 | 25.5 |
|  | S2 | 57.37 | 1.80 | | |
| L2 | S3 | 58.75 | 8.70 | 1.700 | 47.8 |
|  | S4 | −237.36 | 0.15 | | |
| L3 | S5 | 52.91 | 4.30 | 1.834 | 37.3 |
|  | S6 | 120.92 | | | |
|  |  |  | Z1 | | |
| L4 | S7 | 70.22 | 2.00 | 1.805 | 25.5 |
|  | S8 | 17.07 | 5.10 | | |
| L5 | S9 | −64.49 | 2.00 | 1.589 | 61.3 |
|  | S10 | 25.54 | 0.50 | | |
| L6 | S11 | 22.97 | 7.17 | 1.699 | 30.1 |
|  | S12 | −18.35 | | | |
| L7 | S13 | 158.15 | 1.50 | 1.804 | 46.5 |
|  |  |  | Z2 | | |
|  | aperture |  | 1.30 | | |
| L8 | S14 | 61.35 | 2.23 | 1.723 | 38.0 |
|  | S15 | −697.26 | | | |
|  |  |  | Z3 | | |
| L9 | S16 | 31.91 | 4.79 | 1.658 | 57.3 |
|  | S17 | −40.93 | 0.60 | | |
| L10 | S18 | −28.41 | 13.30 | 1.593 | 35.5 |
|  | S19 | 40.69 | 2.84 | | |
|  | S20 | −65.65 | | | |
| L11 | S21 | −27.15 | 3.00 | 1.583 | 46.5 |
|  | S22 | 50.97 | 0.20 | | |
| L12 | S23 | −23.28 | 7.25 | 1.517 | 52.2 |
|  | S24 | −20.86 | 1.79 | | |
| L13 | S25 | −56.24 | 1.60 | 1.847 | 23.8 |

ZOOM DATA

| f/No | EFL mm | FVD mm | Z1 mm | Z2 mm | Z3 mm | BFL mm |
|---|---|---|---|---|---|---|

TABLE II-continued

| | | | | | | |
|---|---|---|---|---|---|---|
| 2.9 | 28.6 | 156.5 | 0.8 | 15.1 | 16.4 | 42.5 |
| 3.2 | 40.0 | 161.8 | 10.6 | 10.4 | 11.3 | 47.8 |
| 3.5 | 55.0 | 166.7 | 19.0 | 6.7 | 6.6 | 52.8 |
| 4.0 | 87.0 | 173.3 | 29.8 | 1.8 | 0.8 | 59.3 |

TABLE III

| Lens | Surface | Surface Radius (mm) | Axial Distance Between Surfaces (mm) | $N_d$ | $V_d$ |
|---|---|---|---|---|---|
| L1 | S1 | 367.16 | | | |
| | | | 3.00 | 1.805 | 25.5 |
| | S2 | 53.15 | | | |
| | | | 1.80 | | |
| L2 | S3 | 54.36 | | | |
| | | | 8.90 | 1.700 | 47.8 |
| | S4 | −220.65 | | | |
| | | | 0.15 | | |
| L3 | S5 | 46.30 | | | |
| | | | 4.00 | 1.834 | 37.3 |
| | S6 | 83.28 | | | |
| | | | Z1 | | |
| L4 | S7 | 59.28 | | | |
| | | | 2.00 | 1.805 | 25.5 |
| | S8 | 16.09 | | | |
| | | | 5.04 | | |
| L5 | S9 | −59.80 | | | |
| | | | 2.00 | 1.609 | 59.2 |
| | S10 | 28.34 | | | |
| | | | 0.50 | | |
| L6 | S11 | 23.44 | | | |
| | | | 8.00 | 1.699 | 30.1 |
| | S12 | −17.37 | | | |
| L7 | | | 1.50 | 1.804 | 46.5 |
| | S13 | 110.83 | | | |
| | | | Z2 | | |
| Aperture | | | | | |
| | | | 1.30 | | |
| | S14 | 63.48 | | | |
| L8 | | | 2.00 | 1.834 | 37.3 |
| | S15 | −659.47 | | | |
| | | | Z3 | | |
| | S16 | 32.68 | | | |
| L9 | | | 4.79 | 1.661 | 57.0 |
| | S17 | −42.95 | | | |
| | | | 0.60 | | |
| | S18 | −29.12 | | | |
| L10 | | | 12.32 | 1.593 | 35.5 |
| | S19 | 43.26 | | | |
| | | | 3.27 | | |
| | S20 | −229.66 | | | |
| L11 | | | 3.80 | 1.543 | 46.9 |
| | S21 | −29.26 | | | |
| | | | 0.20 | | |
| | S22 | 57.54 | | | |
| L12 | | | 7.65 | 1.517 | 52.2 |
| | S23 | −24.09 | | | |
| | | | 1.54 | | |
| | S24 | −21.66 | | | |
| L13 | | | 1.80 | 1.847 | 23.8 |
| | S25 | −68.41 | | | |

ZOOM DATA

| f/No. | EFL mm | FVD mm | Z1 mm | Z2 mm | Z3 mm | BFL mm |
|---|---|---|---|---|---|---|
| 2.9 | 28.6 | 156.3 | 0.84 | 13.30 | 17.20 | 42.3 |
| 3.2 | 48.0 | 161.8 | 10.32 | 9.14 | 11.89 | 47.8 |
| 3.5 | 55.0 | 167.0 | 18.36 | 5.95 | 7.03 | 53.0 |
| 4.0 | 87.0 | 174.3 | 28.70 | 1.78 | .86 | 60.3 |

In the foregoing prescriptions, the front vertex distance (FVD) is calculated from a plane 6.5 mm in front of surfaces S1 when the lenses are focused to a magnification of 1:50.

The lenses set forth in Tables I–III are so designed that the first and fourth groups move in the same direction for zooming. For simplicity of mechanical design of the zooming mechanism and to reduce the required size of the front group, the various lens groups move in fixed relation for focusing. Also the groups G1 and G4 move in fixed relation when zooming.

In the foregoing lens examples, the third group is in simplest form, a single element. In the given examples, the object side surface is convex, and on a much larger radius than the image side surface.

$$\left| \frac{R_I}{R_0} \right| > 8$$

where $R_I$ is the radius of the image side surface and $R_o$ is the radius of the object side surface.

FIGS. 2, 3 and 4 illustrate other embodiments of the invention where the third group at the aperture defining means is in the form of an air spaced doublet. FIG. 2 exemplifies the lens with the groups positioned toward its shorter EFL. The lens comprises elements L1–L6. Elements L1–L3 define a first positive group G1, elements L4–L8 define a second negative group G2. The aperture defining iris D is closely spaced to the third positive group G3 comprising elements L9 and L10. A fourth positive group is defined by elements L11–L16.

Group G1 has the same configuration as in examples I–III. Group G2 is again strongly negative, the forwardmost component is a doublet L4, L5 with the overall shape of a negative meniscus, followed by a biconcave element L6 and a positive doublet L7, L8. The third group G3 follows the aperture defining iris D and comprises a meniscus 19 air spaced from a biconvex element L10. Group G4 comprises a positive element L11, a doublet L12, L13, a biconvex doublet L14, L15, and a negative meniscus L16 concave to the object.

In the lens of FIG. 2, the third group G3 moves in fixed relation with the aperture defining iris I during variation in EFL. As the EFL is increased group G4 moves toward the object end, group G2 moves toward the image end, group G3 and the iris move in fixed relation toward the object, and group G1 moves toward the object.

The lens of FIG. 2 as scaled to an image frame of 24×36 mm for an EFL range of 25.5 mm to 124.0 mm is substantially described in Table IV.

TABLE IV

| Lens | Surface | Surface Radius (mm) | Axial Distance Between Surfaces (mm) | $N_d$ | $V_d$ |
|---|---|---|---|---|---|
| L1 | S1 | 143.67 | | | |
| | | | 3.00 | 1.805 | 25.5 |
| | S2 | 45.42 | | | |
| | | | 0.03 | | |
| | S3 | 45.12 | | | |
| L2 | | | 13.33 | 1.487 | 70.4 |
| | S4 | −417.52 | | | |
| | | | 0.10 | | |
| | S5 | 43.91 | | | |
| L3 | | | 6.94 | 1.868 | 41.2 |
| | S6 | 143.05 | | | |
| | | | Z1 | | |
| | S7 | 99.50 | | | |
| L4 | | | 2.00 | 1.860 | 22.8 |
| | S8 | −85.74 | | | |
| L5 | | | 1.50 | 1.856 | 40.0 |
| | S9 | 12.47 | | | |
| | | | 5.26 | | |
| | S10 | −41.14 | | | |
| L6 | | | 2.00 | 1.847 | 44.5 |
| | S11 | 36.97 | | | |
| | | | 0.20 | | |
| | S12 | 23.01 | | | |

TABLE IV-continued

| Lens | Surface | Surface Radius (mm) | Axial Distance Between Surfaces (mm) | $N_d$ | $V_d$ |
|---|---|---|---|---|---|
| L7 | | | 6.81 | 1.711 | 26.7 |
| | S13 | −13.81 | | | |
| L8 | | | 2.00 | 1.836 | 31.1 |
| | S14 | −91.05 | | | |
| | aperture | | Z2 | | |
| | | | 1.50 | | |
| | S15 | 29.03 | | | |
| L9 | | | 1.63 | 1.847 | 23.8 |
| | S16 | 23.58 | | | |
| | | | 3.32 | | |
| | S17 | 38.96 | | | |
| L10 | | | 4.55 | 1.487 | 70.4 |
| | S18 | −40.98 | | | |
| | | | Z3 | | |
| | S19 | 39.92 | | | |
| L11 | | | 6.00 | 1.487 | 70.4 |
| | S20 | −109.09 | | | |
| | | | 0.50 | | |
| | S21 | 32.42 | | | |
| L12 | | | 8.48 | 1.465 | 65.8 |
| | S22 | −173.96 | | | |
| L13 | | | 2.00 | 1.600 | 38.4 |
| | S23 | 29.36 | | | |
| | | | 1.86 | | |
| | S24 | 54.84 | | | |
| L14 | | | 2.05 | 1.835 | 63.0 |
| | S25 | 19.80 | | | |
| L15 | | | 11.48 | 1.465 | 65.8 |
| | S26 | −20.07 | | | |
| | | | 0.79 | | |
| | S27 | −18.95 | | | |
| L16 | | | 2.50 | 1.835 | 63.0 |
| | S28 | −34.13 | | | |

ZOOM DATA

| f/No | EFL mm | FVD mm | Z1 mm | Z2 mm | Z3 mm | BFL mm |
|---|---|---|---|---|---|---|
| 3.4 | 25.5 | 179.0 | 1.00 | 17.58 | 26.54 | 39.0 |
| 4.1 | 40.0 | 179.6 | 9.53 | 11.05 | 13.26 | 51.0 |
| 4.2 | 85.0 | 185.4 | 28.96 | 5.68 | 1.44 | 54.5 |
| 4.6 | 124.0 | 190.9 | 34.31 | 1.25 | 1.53 | 59.0 |

Another lens embodying the invention is shown in FIG. 3 and comprises thirteen elements L1–L13 in four groups G1–G4. Group G1 comprises elements L1–L3 in the same positive configurations. Group G2 comprises elements L4–L7 in the same general negative configuration as FIG. 1. Group G3 is a positive doublet L8 and L9 in fixed relation to an aperture defining iris I. Group G4 comprises a positive element L10, a biconvex doublet L11, L12 and a negative meniscus concave to the object. Group G4 is of positive power.

Two examples of the lens as shown in FIG. 3 are set forth in Tables V and VI. Both lenses are scaled to an EFL range of 24.5 to 124 mm for a 24×36 mm image frame. In both lenses, the relative aperture varies from f/3.6 at the shorter EFL to f/4.7 at the larger EFL. In both of Tables V and VI, group G3 and the iris I remain stationary. Group G1 moves toward the object end as the EFL is increased, group G2 moves toward the image end, and group G4 moves toward the object end. Group G1 moves for focusing.

TABLE V

| Lens | Surface | Surface Radius (mm) | Axial Distance Between Surfaces (mm) | $N_d$ | $V_d$ |
|---|---|---|---|---|---|
| L1 | S1 | 169.45 | | | |
| | S2 | 56.72 | 3.00 | 1.805 | 25.5 |
| | | | 0.41 | | |
| | S3 | 56.53 | | | |
| L2 | | | 12.60 | 1.487 | 70.4 |
| | S4 | −605.21 | | | |
| | | | 0.10 | | |
| | S5 | 54.35 | | | |
| L3 | | | 6.9 | 1.834 | 37.3 |
| | S6 | 151.66 | | | |
| | | | Z1 | | |
| | S7 | 95.83 | | | |
| L4 | | | 1.50 | 1.834 | 37.3 |
| | S8 | 14.79 | | | |
| | | | 7.53 | | |
| | S9 | −65.44 | | | |
| L5 | | | 2.00 | 1.835 | 63.0 |
| | S10 | 42.84 | | | |
| | | | 0.20 | | |
| | S11 | 27.06 | | | |
| L6 | | | 15.72 | 1.741 | 27.8 |
| | S12 | −26.96 | | | |
| L7 | | | 1.53 | 1.773 | 49.6 |
| | S13 | −508.18 | | | |
| | aperture | | Z2 | | |
| | | | 2.05 | | |
| | S14 | 33.47 | | | |
| L8 | | | 1.50 | 1.847 | 23.8 |
| | S15 | 25.18 | | | |
| | | | 2.66 | | |
| | S16 | 32.36 | | | |
| L9 | | | 4.55 | 1.487 | 70.4 |
| | S17 | −58.18 | | | |
| | | | Z3 | | |
| | S18 | 38.94 | | | |
| L10 | | | 6.00 | 1.564 | 60.8 |
| | S19 | 1862.11 | | | |
| | | | 10.93 | | |
| | S20 | 94.60 | | | |
| L11 | | | 2.00 | 1.850 | 32.2 |
| | S21 | 22.04 | | | |
| L12 | | | 11.50 | 1.471 | 67.3 |
| | S22 | −25.15 | | | |
| | | | 1.94 | | |
| | S23 | −21.83 | | | |
| L13 | | | 2.00 | 1.620 | 60.3 |
| | S24 | −47.40 | | | |

ZOOM DATA

| f/No | EFL mm | FVD mm | Z1 mm | Z2 mm | Z3 mm | BFL mm |
|---|---|---|---|---|---|---|
| 3.6 | 25.5 | 198.8 | 1.000 | 28.636 | 27.353 | 40.0 |
| 4.0 | 40.0 | 198.3 | 12.482 | 16.261 | 13.378 | 44.6 |
| 4.6 | 85.0 | 214.1 | 37.390 | 5.983 | 2.061 | 67.1 |
| 4.7 | 124.0 | 220.1 | 47.590 | .874 | .700 | 69.3 |

TABLE VI

| Lens | Surface | Surface Radius (mm) | Axial Distance Between Surfaces (mm) | $N_d$ | $V_d$ |
|---|---|---|---|---|---|
| L1 | S1 | 188.72 | | | |
| | | | 3.00 | 1.806 | 25.5 |
| | S2 | 56.11 | | | |
| | | | 0.38 | | |
| | S3 | 56.11 | | | |
| L2 | | | 12.20 | 1.487 | 70.4 |
| | S4 | −608.85 | | | |
| | | | 0.10 | | |
| | S5 | 55.24 | | | |
| L3 | | | 6.94 | 1.834 | 37.3 |
| | S6 | 172.29 | | | |
| | | | Z1 | | |
| | S7 | 99.95 | | | |
| L4 | | | 1.50 | 1.834 | 37.3 |
| | S8 | 14.45 | | | |
| | | | 6.83 | | |
| | S9 | −63.20 | | | |
| L5 | | | 2.00 | 1.835 | 43.0 |
| | S10 | 42.33 | | | |
| | | | 0.20 | | |
| | S11 | 26.50 | | | |
| L6 | | | 14.48 | 1.761 | 26.8 |

TABLE VI-continued

| Lens | Surface | Surface Radius | Axial Distance Between Surfaces | $N_d$ | $V_d$ |
|---|---|---|---|---|---|
| | S12 | −28.98 | | | |
| L7 | | | 1.53 | 1.743 | 49.2 |
| | S13 | −699.54 | | | |
| | | | Z2 | | |
| | aperture | | | | |
| | | | 2.05 | | |
| | S14 | 33.36 | | | |
| L8 | | | 1.50 | 1.847 | 23.8 |
| | S15 | 24.83 | | | |
| | | | 2.50 | | |
| | S16 | 31.37 | | | |
| L9 | | | 4.55 | 1.762 | 26.9 |
| | S17 | −56.74 | | | |
| | | | Z3 | | |
| | S18 | 38.07 | | | |
| L10 | | | 6.00 | 1.570 | 60.1 |
| | S19 | 1365.55 | | | |
| | | | 11.47 | | |
| | S20 | 88.72 | | | |
| L11 | | | 2.00 | 1.850 | 32.2 |
| | S21 | 21.05 | | | |
| L12 | | | 11.50 | 1.471 | 67.3 |
| | S22 | −25.14 | | | |
| | | | 1.47 | | |
| | S23 | −21.79 | | | |
| L13 | | | 2.00 | 1.591 | 63.0 |
| | S24 | −47.99 | | | |

ZOOM DATA

| f/No | EFL mm | FVD mm | Z1 mm | Z2 mm | Z3 mm | BFL mm |
|---|---|---|---|---|---|---|
| 3.6 | 25.5 | 194.6 | 0.800 | 26.957 | 27.515 | 40.1 |
| 4.0 | 40.0 | 194.8 | 12.491 | 15.244 | 13.209 | 54.7 |
| 4.6 | 85.0 | 212.2 | 38.085 | 5.614 | 1.817 | 67.4 |
| 4.7 | 124.0 | 219.0 | 48.820 | 0.874 | 0.700 | 69.4 |

FIG. 4 exemplifies another lens form comprising four groups G1–G4. Group G1 comprises elements L1–L3. Group G2 comprises a negative doublet L4, L5 in the overall shape of a meniscus, a biconcave element L6, and a positive doublet L7, L8. Group G2 is of overall negative power. Group G3 comprises a positive doublet L9, L10 closely spaced behind aperture defining iris D. Group G4 comprises a biconvex element L11, a doublet L12, L13, and a triplet L14, L15, L16 of overall biconvex shape. Group G4 is of positive power.

Two lenses as shown in FIG. 4 are described in Table VII and Table VIII as scaled to an EFL range of 24.5 to 124 mm for an image frame of 24×36 mm.

TABLE

| Lens | Surface | Surface Radius (mm) | Axial Distance Between Surfaces (mm) | $N_d$ | $V_d$ |
|---|---|---|---|---|---|
| L1 | S1 | 131.80 | | | |
| | | | 3.00 | 1.805 | 25.5 |
| | S2 | 45.99 | | | |
| | | | 0.40 | | |
| | S3 | 45.95 | | | |
| L2 | | | 13.33 | 1.487 | 70.4 |
| | S4 | −352.60 | | | |
| | | | 0.10 | | |
| | S5 | 44.42 | | | |
| L3 | | | 6.94 | 1.806 | 40.7 |
| | S6 | 145.11 | | | |
| | | | Z1 | | |
| | S7 | 138.87 | | | |
| L4 | | | 2.00 | 1.847 | 23.8 |
| | S8 | −78.66 | | | |
| L5 | | | 1.50 | 1.834 | 37.3 |
| | S9 | 13.60 | | | |
| | | | 5.26 | | |
| | S10 | −53.44 | | | |
| L6 | | | 2.00 | 1.835 | 43.0 |
| | S11 | 29.14 | | | |
| | | | 0.20 | | |
| | S12 | 20.88 | | | |
| L7 | | | 10.12 | 1.717 | 29.5 |
| | S13 | −12.94 | | | |
| L8 | | | 2.00 | 1.806 | 40.7 |
| | S14 | −475.25 | | | |
| | | | Z2 | | |
| | aperture | | | | |
| | | | 2.05 | | |
| | S15 | 32.75 | | | |
| L9 | | | 1.50 | 1.805 | 25.5 |
| | S16 | 24.09 | | | |
| | | | 1.41 | | |
| | S17 | 31.62 | | | |
| L10 | | | 4.55 | 1.487 | 70.4 |
| | S18 | −44.76 | | | |
| | | | Z3 | | |
| | S19 | 42.56 | | | |
| L11 | | | 6.00 | 1.487 | 70.4 |
| | S20 | −72.65 | | | |
| | | | 0.20 | | |
| | S21 | 29.20 | | | |
| L12 | | | 10.00 | 1.487 | 70.4 |
| | S22 | −42.37 | | | |
| L13 | | | 2.00 | 1.548 | 45.8 |
| | S23 | 24.84 | | | |
| | | | 2.00 | | |
| | S24 | 50.95 | | | |
| L14 | | | 2.05 | 1.786 | 43.9 |
| | S25 | 18.30 | | | |
| L15 | | | 11.00 | 1.511 | 60.5 |
| | S26 | −18.72 | | | |
| L16 | | | 2.00 | 1.806 | 40.7 |
| | S27 | −50.49 | | | |

ZOOM DATA

| f/No | EFL mm | FVD mm | Z1 mm | Z2 mm | Z3 mm | BFL mm |
|---|---|---|---|---|---|---|
| 3.8 | 25.5 | 185.0 | 1.000 | 11.408 | 37.476 | 38.5 |
| 4.3 | 40.0 | 185.0 | 9.669 | 6.664 | 23.055 | 49.0 |
| 4.5 | 85.0 | 185.0 | 29.817 | 3.579 | 5.742 | 49.2 |
| 4.0 | 124.0 | 185.0 | 35.019 | 0.150 | 0.401 | 52.8 |

TABLE VIII

| Lens | Surface | Surface Radius (mm) | Axial Distance Between Surfaces (mm) | $N_d$ | $V_d$ |
|---|---|---|---|---|---|
| L1 | S1 | 142.69 | | | |
| | | | 3.00 | 1.805 | 25.5 |
| | S2 | 46.13 | | | |
| | | | 0.40 | | |
| | S3 | 46.01 | | | |
| L2 | | | 13.33 | 1.487 | 70.4 |
| | S4 | −487.79 | | | |
| | | | 0.10 | | |
| | S5 | 44.75 | | | |
| L3 | | | 6.94 | 1.806 | 40.7 |
| | S6 | 145.88 | | | |
| | S7 | 106.19 | Z1 | | |
| L4 | | | 2.00 | 1.847 | 23.8 |
| | S8 | −73.61 | | | |
| L5 | | | 1.50 | 1.834 | 37.3 |
| | S9 | 12.93 | | | |
| | | | 5.26 | | |
| | S10 | −49.58 | | | |
| L6 | | | 2.00 | 1.835 | 43.0 |
| | S11 | 39.03 | | | |
| | | | 0.20 | | |
| | S12 | 21.94 | | | |
| L7 | | | 14.07 | 1.717 | 29.5 |
| | S13 | −13.02 | | | |
| L8 | | | 2.00 | 1.806 | 40.1 |
| | S14 | 584.71 | | | |
| | | | Z2 | | |
| | aperture | | | | |
| | | | 2.05 | | |
| | S15 | 31.39 | | | |
| L9 | | | 1.50 | 1.805 | 25.5 |

TABLE VIII-continued

| | | | | | |
|---|---|---|---|---|---|
| | S16 | 23.71 | | | |
| | | | 1.58 | | |
| | S17 | 31.06 | | | |
| L10 | | | 4.55 | 1.487 | 70.4 |
| | S18 | −51.85 | | | |
| | | | Z3 | | |
| | S19 | 43.25 | | | |
| L11 | | | 6.00 | 1.487 | 70.4 |
| | S20 | −70.85 | | | |
| | | | 0.20 | | |
| | S21 | 27.36 | | | |
| L12 | | | 10.00 | 1.487 | 70.4 |
| | S22 | −43.76 | | | |
| L13 | | | 2.00 | 1.541 | 47.2 |
| | S23 | 23.42 | | | |
| | | | 2.00 | | |
| | S24 | 45.83 | | | |
| L14 | | | 2.05 | 1.786 | 43.9 |
| | S25 | 16.77 | | | |
| L15 | | | 11.00 | 1.511 | 60.5 |
| | S26 | −18.30 | | | |
| L16 | | | 2.00 | 1.806 | 40.7 |
| | S27 | −52.02 | | | |

ZOOM DATA

| f/No | EFL mm | FVD mm | Z1 mm | Z2 mm | Z3 mm | BFL mm |
|---|---|---|---|---|---|---|
| 3.8 | 25.5 | 179.1 | 1.000 | 11.328 | 26.532 | 38.5 |
| 4.3 | 40.0 | 183.3 | 9.993 | 6.959 | 15.013 | 50.6 |
| 4.5 | 85.0 | 194.9 | 30.520 | 3.333 | 3.717 | 56.6 |
| 4.6 | 124.0 | 203.1 | 35.169 | 0.292 | 0.500 | 66.4 |

The lens of Table VII has a relative aperture varying from f/3.8 at the shorter EFL to f/4.6 at the larger EFL. The front vertex distance (FVD) of this lens does not change during zooming. As the FFL is increased from the lower value, group G2 moves toward the image end, group G3 and iris D move in fixed relation toward the image end and group G4 moves toward the object end.

The lens of Table VIII has a relative aperture varying from f/3.8 to f/4.6 at the larger EFL. Here all four groups move during zooming. As the EFL is increased, group G1 moves toward the object end, group G2 moves toward the image end, group G3 and iris D first move toward the image end and then reverse and move toward the object end, and group G4 moves toward the object.

In the prescriptions of Tables IV—VIII, the front vertex distance (FVD) is calculated from a plane 5.00 mm in front of surfaces 51. In tables IV and VI the lenses are focused for a magnification of 1:40 and in tables V, VII and VIII the lenses are focused at infinity.

The powers of the groups G1-G4 of the various lenses are set forth in Table IX as $K_1$-$K_4$ respectively together with the geometric mean of the powers $K_G$ of the lens at the ERL extremities, and the zoom ratio $Z_R$.

TABLE IX

| Table | $K_1$ | $K_2$ | $K_3$ | $K_4$ | $K_G$ | $Z_R$ |
|---|---|---|---|---|---|---|
| I | .0121 | −.0498 | .0114 | .0224 | .020 | 3.04 |
| II | .0118 | −.0512 | .0129 | .0220 | .020 | 3.04 |
| III | .0121 | −.0556 | .0145 | .0223 | .020 | 3.04 |
| IV | .0143 | −.0726 | .0182 | .0149 | .0178 | 4.86 |
| V | .0103 | −.0521 | .0156 | .0110 | .0178 | 4.86 |
| VI | .0137 | −.0748 | .0177 | .0186 | .0178 | 4.86 |
| VII | .0102 | −.0528 | .0159 | .0115 | .0178 | 4.86 |
| VIII | .0129 | −.0763 | .0171 | .0189 | .0178 | 4.86 |

$K_G = \sqrt{K_L K_S}$ where $K_L$ is the power of the lens at its longest EFL and $K_S$ is the power of the lens at its shortest EFL.

It will be noted from the foregoing examples that the power $K_3$ of group G3 is substantially equal to or greater than the power $K_1$ of the front group G1. Also $K_3$ is substantially equal to or less than the geometric mean power $K_G$ of the lens at the extremes of its EFL range.

The power $K_3$ of group G3 as shown above bears certain relationships to other parameters of the lens:

$$1.2 > (K_3/K_G) > 0.4$$

$$0.006 > (K_3/Z_R) > 0.003$$

$$0.25 > (K_3/K_G Z_R) > 0.15$$

The third group G3 may be placed on either side of the iris; however, in most cases to permit movement of the other groups to provide the smallest FVD, it will be very closely spaced to the image side of the iris.

While preferred embodiments of the invention have been described, alternate embodiments, as well as other embodiments of the invention may occur to those skilled in the art. Accordingly, the appended claims are intended to encompass all modifications and embodiments of the invention which do not depart from the spirit and scope of the invention.

What I claim is:

1. A lens of variable equivalent focal length comprising from the object end a first positive group, a second negative group, an aperture defining means, a third positive group closely spaced in fixed relation to the aperture defining means, and a fourth positive group, said second and fourth groups being movable to vary the equivalent focal length of the lens, said third group and said aperture defining means remaining stationary during change in equivalent focal length.

2. The lens of claim 1 wherein said first group also moves to vary the equivalent focal length of said lens.

3. The lens of claim 2 wherein said first and fourth groups move in fixed relation.

4. The lens of claim 1 where all of said groups move in fixed relation to focus said lens.

5. The lens of claim 1 wherein said third group comprises a single element and $$\left| \frac{R_I}{R_0} \right| > 8$$

where the image side surface of said element is defined on a radius $R_I$ and the object side surface of said element is defined on a radius $R_o$.

6. The lens of claim 1 wherein said third group comprises two elements.

7. The lens of claim 6 wherein said third group comprises a negative meniscus and a biconvex element.

8. The lens of claim 1 wherein:

$$0.3 > K_3/K_G Z_R > 0.15$$

where
$K_3$ is the power of the third group
$K_G$ is the geometric mean of the powers of the lens at the extremes of its focal length range, and
$Z_R$ is the zoom ratio of the lens.

9. The lens of claim 1 wherein:

$1.3 > K_3/K_G > 0.4$ where
K₃ is the power of the third group, and
$K_G$ is the geometric mean of the powers of the lens at the extremes of its focal length range.

10. In a lens of variable focal length, of the type where a negative group on the object side of an aperture defining means and a positive group on the image side of the aperture defining means move axially with respect to the aperture defining means to vary the equivalent focal length of the lens, the improvement comprising, a positive lens component closely, positioned to said aperture defining means and in fixed relation thereto; said aperture defining means and said positive lens component remaining stationary during variation of the equivalent focal length.

11. The lens of claim 10 wherein:

$0.3 > K_3/K_G Z_R > 0.15$ where
$K_3$ is the power of said positive lens component
$K_G$ is the geometric means of the powers of the lens at the extremes of its focal length range, and
$Z_R$ is the zoom ratio of the lens.

12. The lens of claim 10 wherein:

$1.3 > K_3/K_G > 0.4$

13. The lens of claim 1 where the power of said positive group in fixed relation to the aperture defining means is substantially equal to or greater than the power of said front group.

14. The lens of claim 1 where the power of said positive group in fixed relation to the aperture defining means is substantially equal to or less than the geometric mean power of said lens.

15. The lens of claim 1 where the power of said third group is substantially equal to or greater than the power of said first group and substantially equal to or less then the geometric mean of the powers of the lens at the extremes of its equivalent focal lengths.

16. A zoom lens comprising means defining a variable aperture, a first positive and a second negative lens group on the object side of said aperture defining means, a positive group on the image side of said aperture defining means, said lens groups being axially movable with respect to said aperture defining means to vary the equivalent focal length of said lens and a third positive group closely positioned to said aperture defining means and in fixed relation thereto, said third group being stationary as said other groups are moved to vary the equivalent focal length, all of said groups being movable in fixed relation to focus said lens.

17. The lens of claim 16 wherein said positive group on the object side of said negative group and said positive group on the image side of said aperture defining means move in fixed relation with variation in equivalent focal length.

18. The lens of claim 16 where the group in fixed relation to said aperture defining means has an optical power $K_3$, the geometric mean power of said lens is $K_G$, and lens has a zoom ratio $Z_R$, and $0.25 > K_3/K_G Z_R > 0.15$ 19. The lens of claim 16 where $0.006 > K_3/Z_R > 0.003$ 20. The lens of claim 16 where $1.2 > K_3/K_G > 0.4$ 21. A lens according to claim 1 as scaled to an equivalent focal length of 28.5 to 87.0 mm for a 24×36 mm image frame defined substantially as follows:

| Lens | Surface | Surface Radius (mm) | Axial Distance Between Surfaces (mm) | $N_d$ | $V_d$ |
|---|---|---|---|---|---|
| L1 | S1 | 878.67 | | | |
|    |    |        | 3.00 | 1.805 | 25.5 |
|    | S2 | 53.00 | | | |
|    |    |       | 1.80 | | |
| L2 | S3 | 54.94 | | | |
|    |    |       | 8.70 | 1.786 | 43.9 |
|    | S4 | −295.19 | | | |
|    |    |        | 0.15 | | |
| L3 | S5 | 49.87 | | | |
|    |    |       | 4.30 | 1.835 | 43.0 |
|    | S6 | 100.18 | | | |
|    |    |        | Z1 | | |
| L4 | S7 | 83.91 | | | |
|    |    |       | 2.00 | 1.850 | 32.2 |
|    | S8 | 17.34 | | | |
|    |    |       | 4.80 | | |
| L5 | S9 | −116.10 | | | |
|    |    |         | 2.00 | 1.835 | 43.0 |
|    | S10 | 33.18 | | | |
|    |    |        | 0.20 | | |
| L6 | S11 | 25.25 | | | |
|    |    |        | 11.54 | 1.728 | 28.3 |
| L7 | S12 | −17.23 | | | |
|    |    |         | 1.50 | 1.835 | 43.0 |
|    | S13 | −826.07 | | | |
|    |    |         | Z2 | | |
|    | aperture | | | | |
|    |    |        | 1.00 | | |
| L8 | S14 | 55.92 | | | |
|    |    |        | 2.23 | 1.667 | 48.3 |
|    | S15 | 1165.66 | | | |
|    |    |         | Z3 | | |
| L9 | S16 | 28.44 | | | |
|    |    |        | 4.79 | 1.613 | 58.6 |
|    | S17 | −41.59 | | | |
|    |    |         | 0.79 | | |
| L10 | S18 | −28.11 | | | |
|    |    |         | 12.00 | 1.593 | 35.5 |
|    | S19 | 38.61 | | | |
|    |    |        | 2.68 | | |
| L11 | S20 | −145.85 | | | |
|    |    |         | 3.00 | 1.835 | 43.0 |
|    | S21 | −31.12 | | | |
|    |    |         | 0.20 | | |
| L12 | S22 | 51.53 | | | |
|    |    |        | 5.97 | 1.573 | 42.6 |
|    | S23 | −23.68 | | | |
|    |    |         | 0.99 | | |
| L13 | S24 | 21.43 | | | |
|    |    |        | 1.60 | 1.805 | 25.5 |
|    | S25 | −993.13 | | | |

| | | ZOOM DATA | | | |
|---|---|---|---|---|---|
| EFL | FVD | Z1 | Z2 | Z3 | BFL |
| 28.6mm | 156.4mm | .80mm | 15.3mm | 14.7mm | 43.6 |
| 40.0 | 161.3 | 10.4 | 10.4 | 10.3 | 48.5 |
| 55.0 | 165.0 | 18.6 | 6.5 | 6.0 | 53.1 |
| 87.0 | 171.7 | 29.2 | 1.0 | 0.8 | 58.9 | where L1–L13 are lens elements from the object end; S1–S25 are the lens surfaces from the object end with positive radii struck from the right and negative ratii struck from the left; $N_d$ is the index of refraction of the lens element; $V_d$ is the Abbe number of the lens elements; Z1, Z2 and Z3 are variable during change in equivalent focal length; EFL is the equivalent focal length; FVD is the front vertex distance; and BFL is the back focal length.

22. A lens according to claim 1 as scaled to an equivalent focal length of 28.5 to 87.0 mm for a 24×36 mm image frame defined substantially as follows:

| Lens | Surface | Surface Radius (mm) | Axial Distance Between Surfaces (mm) | $N_d$ | $V_d$ |
|---|---|---|---|---|---|
| L1 | S1 | 649.67 | | | |
|  | S2 | 57.37 | 3.00 | 1.805 | 25.5 |
| L2 | S3 | 58.75 | 1.80 | | |
|  | S4 | −237.36 | 8.70 | 1.700 | 47.8 |
| L3 | S5 | 52.91 | 0.15 | | |
|  | S6 | 120.92 | 4.30 | 1.834 | 37.3 |
| L4 | S7 | 70.22 | Z1 | | |
|  | S8 | 17.07 | 2.00 | 1.805 | 25.5 |
| L5 | S9 | −64.49 | 5.10 | | |
|  | S10 | 25.54 | 2.00 | 1.589 | 61.3 |
| L6 | S11 | 22.97 | 0.50 | | |
|  | S12 | −18.35 | 7.17 | 1.699 | 30.1 |
| L7 | S13 | 158.15 | 1.50 | 1.804 | 46.5 |
| aperture | | | Z2 | | |
| L8 | S14 | 61.35 | 1.30 | | |
|  | S15 | −697.26 | 2.23 | 1.723 | 38.0 |
| L9 | S16 | 31.91 | Z3 | | |
|  | S17 | −40.93 | 4.79 | 1.658 | 57.3 |
| L10 | S18 | −28.41 | 0.60 | | |
|  | S19 | 40.69 | 13.30 | 1.593 | 35.5 |
| L11 | S20 | −65.65 | 2.84 | | |
|  | S21 | −27.15 | 3.00 | 1.583 | 46.5 |
| L12 | S22 | 50.97 | 0.20 | | |
|  | S23 | −23.28 | 7.25 | 1.517 | 52.2 |
| L13 | S24 | −20.86 | 1.79 | | |
|  | S25 | −56.24 | 1.60 | 1.847 | 23.8 |

| ZOOM DATA | | | | | |
|---|---|---|---|---|---|
| EFL | FVD | Z1 | Z2 | Z3 | BFL |
| 28.6mm | 156.5mm | 0.8mm | 15.1mm | 16.4mm | 42.5mm |
| 40.0 | 161.8 | 10.6 | 10.4 | 11.3 | 47.8 |
| 55.0 | 166.7 | 19.0 | 6.7 | 6.6 | 52.8 |
| 87.0 | 173.3 | 29.8 | 1.8 | 0.8 | 59.3 | where L1–L13 are lens elements from the object end; S1–S25 are the lens surfaces from the object end with positive radii struck from the right and negative radii struck from the left; $N_d$ is the index of refraction of the lens elements; $V_d$ is the Abbe number of the lens elements; Z1, Z2 and Z3 are variable during change in equivalent focal length; EFL is the equivalent focal length; FVD is the front vertex distance; and BFL is the back focal length.

23. A lens according to claim 1 as scaled to an equivalent focal length of 28.5 to 87.0 mm for a 24×36 mm image frame defined substantially as follows:

| Lens | Surface | Surface Radius (mm) | Axial Distance Between Surfaces (mm) | $N_d$ | $V_d$ |
|---|---|---|---|---|---|
| L1 | S1 | 367.16 | | | |
|  | S2 | 53.15 | 3.00 | 1.805 | 25.5 |
| L2 | S3 | 54.36 | 1.80 | | |
|  | S4 | −220.65 | 8.90 | 1.700 | 47.8 |
| L3 | S5 | 46.30 | 0.15 | | |
|  | S6 | 83.28 | 4.00 | 1.834 | 37.3 |
| L4 | S7 | 59.28 | Z1 | | |
|  | S8 | 16.09 | 2.00 | 1.805 | 25.5 |
| L5 | S9 | −59.80 | 5.04 | | |
|  | S10 | 28.34 | 2.00 | 1.609 | 59.2 |
| L6 | S11 | 23.44 | 0.50 | | |
|  | S12 | −17.37 | 8.00 | 1.699 | 30.1 |
| L7 | S13 | 110.83 | 1.50 | 1.804 | 46.5 |
| Aperture | | | Z2 | | |
| L8 | S14 | 63.48 | 1.30 | | |
|  | S15 | −659.47 | 2.00 | 1.834 | 37.3 |
| L9 | S16 | 32.68 | Z3 | | |
|  | S17 | −42.95 | 4.79 | 1.661 | 57.0 |
| L10 | S18 | −29.12 | 0.60 | | |
|  | S19 | 43.26 | 12.32 | 1.593 | 35.5 |
| L11 | S20 | −229.66 | 3.27 | | |
|  | S21 | −29.26 | 3.80 | 1.543 | 46.9 |
| L12 | S22 | 57.54 | 0.20 | | |
|  | S23 | −24.09 | 7.65 | 1.517 | 52.2 |
| L13 | S24 | −21.66 | 1.54 | | |
|  | S25 | −68.41 | 1.80 | 1.847 | 23.8 |

| ZOOM DATA | | | | | |
|---|---|---|---|---|---|
| EFL mm | FVD mm | Z1 mm | Z2 mm | Z3 mm | BFL mm |
| 28.6 | 156.3 | 0.84 | 13.30 | 17.20 | 42.3 |
| 48.0 | 161.8 | 10.32 | 9.14 | 11.89 | 47.8 |
| 55.0 | 167.0 | 18.36 | 5.95 | 7.03 | 53.0 |
| 87.0 | 174.3 | 28.70 | 1.78 | .86 | 60.3 | where L1–L13 are lens elements from the object end; S1–S25 are the lens surfaces from the object end with positive radii struck from the right and negative radii struck from the left; $N_d$ is the index of refraction of the lens elements; $V_d$ is the Abbe number of the lens elements; Z1, Z2, and Z3 are variable during change in equivalent focal length; EFL is the equivalent focal length; FVD is the front vertex distance; and BFL is the back focal length.

24. A lens according to claim 1 as scaled to an equivalent focal length of 25.5 to 124.0 mm for a 24×36 mm image frame defined substantially as follows:

| Lens | Surface | Surface Radius (mm) | Axial Distance Between Surfaces (mm) | $N_d$ | $V_d$ |
|---|---|---|---|---|---|
| L1 | S1 | 143.67 | | | |
| | | | 3.00 | 1.805 | 25.5 |
| | S2 | 45.42 | | | |
| | | | 0.03 | | |
| | S3 | 45.12 | | | |
| L2 | | | 13.33 | 1.487 | 70.4 |
| | S4 | −417.52 | | | |
| | | | 0.10 | | |
| | S5 | 43.91 | | | |
| L3 | | | 6.94 | 1.868 | 41.2 |
| | S6 | 143.05 | | | |
| | | | Z1 | | |
| | S7 | 99.50 | | | |
| L4 | | | 2.00 | 1.860 | 22.8 |
| | S8 | −85.74 | | | |
| L5 | S9 | 12.47 | 1.50 | 1.856 | 40.0 |
| | | | 5.26 | | |
| | S10 | −41.14 | | | |
| L6 | | | 2.00 | 1.847 | 44.5 |
| | S11 | 36.97 | | | |
| | | | 0.20 | | |
| | S12 | 23.01 | | | |
| L7 | | | 6.81 | 1.711 | 26.7 |
| | S13 | −13.81 | | | |
| L8 | | | 2.00 | 1.836 | 31.1 |
| | S14 | −91.05 | | | |
| | | | Z2 | | |
| aperture | | | 1.50 | | |
| | S15 | 29.03 | | | |
| L9 | | | 1.63 | 1.847 | 23.8 |
| | S16 | 23.58 | | | |
| | | | 3.32 | | |
| | S17 | 38.96 | | | |
| L10 | | | 4.55 | 1.487 | 70.4 |
| | S18 | −40.98 | | | |
| | | | Z3 | | |
| | S19 | 39.92 | | | |
| L11 | | | 6.00 | 1.487 | 70.4 |
| | S20 | −109.09 | | | |
| | | | 0.50 | | |
| | S21 | 32.42 | | | |
| L12 | | | 8.48 | 1.465 | 65.8 |
| | S22 | −173.96 | | | |
| L13 | | | 2.00 | 1.600 | 38.4 |
| | S23 | 29.36 | | | |
| | | | 1.86 | | |
| | S24 | 54.84 | | | |
| L14 | | | 2.05 | 1.835 | 63.0 |
| | S25 | 19.80 | | | |
| L15 | | | 11.48 | 1.465 | 65.8 |
| | S26 | −20.07 | | | |
| | | | 0.79 | | |
| | S27 | −18.95 | | | |
| L16 | | | 2.50 | 1.835 | 63.0 |
| | S28 | −34.13 | | | |

ZOOM DATA

| EFL mm | FVD mm | Z1 mm | Z2 mm | Z3 mm | BFL mm |
|---|---|---|---|---|---|
| 25.5 | 179.0 | 1.00 | 17.58 | 26.54 | 39.0 |
| 40.0 | 179.6 | 9.53 | 11.05 | 13.26 | 51.0 |
| 85.0 | 185.4 | 28.96 | 5.68 | 1.44 | 54.5 |
| 124.0 | 190.9 | 34.31 | 1.25 | 1.53 | 59.0 | where L1-L16 are lens elements from the object end; S1-S28 are the lens surfaces from the object end with positive radii struck from the right and negative radii struck from the left; $N_d$ is the index of refraction of the lens elements; $V_d$ is the Abbe number of the lens elements; Z1, Z2 and Z3 are variable during change in equivalent focal length; EFL is the equivalent focal length; FVD is the front vertex distance; and BFL is the back focal length.

25. A lens according to claim 1 as scaled to an equivalent focal length of 25.5 to 124.0 mm for a 24×36 mm image frame defined substantially as follows:

| Lens | Surface | Surface Radius (mm) | Axial Distance Between Surfaces (mm) | $N_d$ | $V_d$ |
|---|---|---|---|---|---|
| L1 | S1 | 169.45 | | | |
| | | | 3.00 | 1.805 | 25.5 |
| | S2 | 56.72 | | | |
| | | | 0.41 | | |
| | S3 | 56.53 | | | |
| L2 | | | 12.60 | 1.487 | 70.4 |
| | S4 | −605.21 | | | |
| | | | 0.10 | | |
| | S5 | 54.35 | | | |
| L3 | | | 6.9 | 1.834 | 37.3 |
| | S6 | 151.66 | | | |
| | | | Z1 | | |
| | S7 | 95.83 | | | |
| L4 | | | 1.50 | 1.834 | 37.3 |
| | S8 | 14.79 | | | |
| | | | 7.53 | | |
| | S9 | −65.44 | | | |
| L5 | | | 2.00 | 1.835 | 63.0 |
| | S10 | 42.84 | | | |
| | | | 0.20 | | |
| | S11 | 27.06 | | | |
| L6 | | | 15.72 | 1.741 | 27.8 |
| | S12 | −26.96 | | | |
| L7 | | | 1.53 | 1.773 | 49.6 |
| | S13 | −508.18 | | | |
| | | | Z2 | | |
| aperture | | | 2.05 | | |
| | S14 | 33.47 | | | |
| L8 | | | 1.50 | 1.847 | 23.8 |
| | S15 | 25.18 | | | |
| | | | 2.66 | | |
| | S16 | 32.36 | | | |
| L9 | | | 4.55 | 1.487 | 70.4 |
| | S17 | −58.18 | | | |
| | | | Z3 | | |
| | S18 | 38.94 | | | |
| L10 | | | 6.00 | 1.564 | 60.8 |
| | S19 | 1862.11 | | | |
| | | | 10.93 | | |
| | S20 | 94.60 | | | |
| L11 | | | 2.00 | 1.850 | 32.2 |
| | S21 | 22.04 | | | |
| L12 | | | 11.50 | 1.471 | 67.3 |
| | S22 | −25.15 | | | |
| | | | 1.94 | | |
| | S23 | −21.83 | | | |
| L13 | | | 2.00 | 1.620 | 60.3 |
| | S24 | −47.40 | | | |

ZOOM DATA

| EFL mm | FVD mm | Z1 mm | Z2 mm | A3 mm | BFL mm |
|---|---|---|---|---|---|
| 25.5 | 198.8 | 1.000 | 28.636 | 27.353 | 40.0 |
| 40.0 | 198.3 | 12.482 | 16.261 | 13.378 | 4.46 |
| 85.0 | 214.1 | 37.390 | 5.983 | 2.061 | 67.1 |
| 124.0 | 220.1 | 47.590 | .874 | .700 | 69.3 | where L1-L13 are lens elements from the object end; S1-S24 are the lens surfaces from the object end with positive radii struck from the right and negative radii struck from the left; $N_d$ is the index of refraction of the lens element; $V_d$ is the Abbe number of the lens elements; Z1, Z2 and Z3 are variable during change in equivalent focal length; EFL is the equivalent focal length; FVD is the front vertex distance; and BFL is the back focal length.

26. A lens according to claim 1 as scaled to an equivalent focal length of 25.5 to 124.0 mm for a 24×36 mm image frame defined substantially as follows:

| Lens | Surface | Surface Radius (mm) | Axial Distance Between Surfaces (mm) | $N_d$ | $V_d$ |
|---|---|---|---|---|---|
| L1 | S1 | 188.72 | | | |
| | S2 | 56.11 | 3.00 | 1.806 | 25.5 |
| | | | 0.38 | | |
| L2 | S3 | 56.11 | | | |
| | S4 | −608.85 | 12.20 | 1.487 | 70.4 |
| | | | 0.10 | | |
| L3 | S5 | 55.24 | | | |
| | S6 | 172.29 | 6.94 | 1.834 | 37.3 |
| | | | Z1 | | |
| L4 | S7 | 99.95 | | | |
| | S8 | 14.45 | 1.50 | 1.834 | 37.3 |
| | | | 6.83 | | |
| L5 | S9 | −63.20 | | | |
| | S10 | 42.33 | 2.00 | 1.835 | 43.0 |
| | | | 0.20 | | |
| L6 | S11 | 26.50 | | | |
| | S12 | −28.98 | 14.48 | 1.761 | 26.8 |
| L7 | S13 | −699.54 | 1.53 | 1.743 | 49.2 |
| | | | Z2 | | |
| aperture | | | 2.05 | | |
| L8 | S14 | 33.36 | | | |
| | S15 | 24.83 | 1.50 | 1.847 | 23.8 |
| | | | 2.50 | | |
| L9 | S16 | 31.37 | | | |
| | S17 | −56.74 | 4.55 | 1.762 | 26.9 |
| | | | Z3 | | |
| L10 | S18 | 38.07 | | | |
| | S19 | 1365.55 | 6.00 | 1.570 | 60.1 |
| | | | 11.47 | | |
| L11 | S20 | 88.72 | | | |
| | S21 | 21.05 | 2.00 | 1.850 | 32.2 |
| L12 | S22 | −25.14 | 11.50 | 1.471 | 67.3 |
| | | | 1.47 | | |
| L13 | S23 | −21.79 | | | |
| | S24 | −47.99 | 2.00 | 1.591 | 63.0 |

ZOOM DATA

| EFL mm | FVD mm | Z1 mm | Z2 mm | Z3 mm | BFL mm |
|---|---|---|---|---|---|
| 25.5 | 194.6 | 0.800 | 26.957 | 27.515 | 40.1 |
| 40.0 | 194.8 | 12.491 | 15.244 | 13.209 | 54.7 |
| 85.0 | 212.2 | 38.085 | 5.614 | 1.817 | 67.4 |
| 124.0 | 219.0 | 48.820 | 0.874 | 0.700 | 69.4 | wherein L1–L13 are lens elements from the object end; S1–S24 are the lens surfaces from the object end with positive radii struck from the right and negative radii struck from the left; $N_d$ is the index of refraction of the lens elements; $V_d$ is the Abbe number of the lens elements; Z1, Z2, and Z3 are variable during change in equivalent focal length; EFL is the equivalent focal length; FVD is the front vertex distance; and BFL is the back focal length.

27. A lens according to claim 1 as scaled to an equivalent focal length of 25.5 to 124.0 mm for a 24×36 mm image frame defined substantially as follows:

| Lens | Surface | Surface Radius (mm) | Axial Distance Between Surfaces (mm) | $N_d$ | $V_d$ |
|---|---|---|---|---|---|
| L1 | S1 | 131.80 | | | |
| | S2 | 45.99 | 3.00 | 1.805 | 25.5 |
| | | | 0.40 | | |
| L2 | S3 | 45.95 | | | |
| | S4 | −352.60 | 13.33 | 1.487 | 70.4 |
| | | | 0.10 | | |
| L3 | S5 | 44.42 | | | |
| | S6 | 145.11 | 6.94 | 1.806 | 40.7 |
| | | | Z1 | | |
| L4 | S7 | 138.87 | | | |
| | S8 | −78.66 | 2.00 | 1.847 | 23.8 |
| L5 | S9 | 13.60 | 1.50 | 1.834 | 37.3 |
| | | | 5.26 | | |
| L6 | S10 | −53.44 | | | |
| | S11 | 29.14 | 2.00 | 1.835 | 43.0 |
| | | | 0.20 | | |
| L7 | S12 | 20.88 | | | |
| | S13 | −12.94 | 10.12 | 1.717 | 29.5 |
| L8 | S14 | −475.25 | 2.00 | 1.806 | 40.7 |
| | | | Z2 | | |
| aperture | | | 2.05 | | |
| L9 | S15 | 32.75 | | | |
| | S16 | 24.09 | 1.50 | 1.805 | 25.5 |
| | | | 1.41 | | |
| L10 | S17 | 31.62 | | | |
| | S18 | −44.76 | 4.55 | 1.487 | 70.4 |
| | | | Z3 | | |
| L11 | S19 | 42.56 | | | |
| | S20 | −72.65 | 6.00 | 1.487 | 70.4 |
| | | | 0.20 | | |
| L12 | S21 | 29.20 | | | |
| | S22 | −42.37 | 10.00 | 1.487 | 70.4 |
| L13 | S23 | 24.84 | 2.00 | 1.548 | 45.8 |
| | | | 2.00 | | |
| L14 | S24 | 50.95 | | | |
| | S25 | 18.30 | 2.05 | 1.786 | 43.9 |
| L15 | S26 | −18.72 | 11.00 | 1.511 | 60.5 |
| L16 | S27 | −50.49 | 2.00 | 1.806 | 40.7 |

ZOOM DATA

| EFL mm | FVD mm | Z1 mm | Z2 mm | Z3 mm | BFL mm |
|---|---|---|---|---|---|
| 25.5 | 185.0 | 1.000 | 11.408 | 37.476 | 38.5 |
| 40.0 | 185.0 | 9.669 | 6.664 | 23.055 | 49.0 |
| 85.0 | 185.0 | 29.817 | 3.579 | 5.742 | 49.2 |
| 124.0 | 185.0 | 35.019 | 0.150 | 0.401 | 52.8 | where L1–L16 are lens elements from the object end; S1–S27 are the lens surfaces from the object end with positive radii struck from the right and negative radii struck from the left; $N_d$ is the index of refraction of the lens elements; $V_d$ is the Abbe number of the lens elements; Z1, Z2, and Z3 are variable during change in equivalent focal length; EFL is the equivalent focal length; FVD is the front vertex distance; and BFL is the back focal length.

28. A lens according to claim 1 as scaled to an equivalent focal length of 25.5 to 124.0 mm for a 24×36 mm image frame defined substantially as follows:

| Lens | Surface | Surface Radius (mm) | Axial Distance Between Surfaces (mm) | $N_d$ | $V_d$ |
|---|---|---|---|---|---|
| L1 | S1 | 142.69 | | | |
|  | | | 3.00 | 1.805 | 25.5 |
|  | S2 | 46.13 | | | |
|  | | | 0.40 | | |
|  | S3 | 46.01 | | | |
| L2 | | | 13.33 | 1.487 | 70.4 |
|  | S4 | −487.79 | | | |
|  | | | 0.10 | | |
|  | S5 | 44.75 | | | |
| L3 | | | 6.94 | 1.806 | 40.7 |
|  | S6 | 145.88 | | | |
|  | | | Z1 | | |
|  | S7 | 106.19 | | | |
| L4 | | | 2.00 | 1.847 | 23.8 |
|  | S8 | −73.61 | | | |
| L5 | | | 1.50 | 1.834 | 37.3 |
|  | S9 | 12.93 | | | |
|  | | | 5.26 | | |
|  | S10 | −49.58 | | | |
| L6 | | | 2.00 | 1.835 | 43.0 |
|  | S11 | 39.03 | | | |
|  | | | 0.20 | | |
|  | S12 | 21.94 | | | |
| L7 | | | 14.07 | 1.717 | 29.5 |
|  | S13 | −13.02 | | | |
| L8 | | | 2.00 | 1.806 | 40.1 |
|  | S14 | 584.71 | | | |
|  | | | Z2 | | |
|  | aperture | | | | |
|  | | | 2.05 | | |
|  | S15 | 31.39 | | | |
| L9 | | | 1.50 | 1.805 | 25.5 |
|  | S16 | 23.71 | | | |
|  | | | 1.58 | | |
|  | S17 | 31.06 | | | |
| L10 | | | 4.55 | 1.487 | 70.4 |
|  | S18 | −51.85 | | | |
|  | | | Z3 | | |
|  | S19 | 43.25 | | | |
| L11 | | | 6.00 | 1.487 | 70.4 |
|  | S20 | −70.85 | | | |
|  | | | 0.20 | | |
|  | S21 | 27.36 | | | |
| L12 | | | 10.00 | 1.487 | 70.4 |
|  | S22 | −43.76 | | | |
| L13 | | | 2.00 | 1.541 | 47.2 |
|  | S23 | 23.42 | | | |
|  | | | 2.00 | | |
|  | S24 | 45.83 | | | |
| L14 | | | 2.05 | 1.786 | 43.9 |
|  | S25 | 16.77 | | | |
| L15 | | | 11.00 | 1.511 | 60.5 |
|  | S26 | −18.30 | | | |
| L16 | | | 2.00 | 1.806 | 40.7 |
|  | S27 | −52.02 | | | |

ZOOM DATA

| EFL mm | FVD mm | Z1 mm | Z2 mm | Z3 mm | BFL mm |
|---|---|---|---|---|---|
| 25.5 | 179.1 | 1.000 | 11.328 | 26.532 | 38.5 |
| 40.0 | 183.3 | 9.993 | 6.959 | 15.013 | 50.6 |
| 85.0 | 194.9 | 30.520 | 3.333 | 3.717 | 56.6 |
| 124.0 | 203.1 | 35.169 | 0.292 | 0.500 | 66.4 | where L1–L16 are lens elements from the object end; S1–S27 are the lens surfaces from the object end with positive radii struck from the right and negative radii struck from the left; $N_d$ is the index of refraction of the lens elements; $V_d$ is the Abbe number of the lens elements; Z1, Z2 and Z3 are variable during change in equivalent focal length; EFL is the equivalent length; FVD is the front vertex distance; and BFL is the back focal length.

29. A lens of variable equivalent focal length consisting from the object end a first positive group, a second negative group, a third positive group, and a fourth positive group, an aperture defining means closely positioned to said third group and in fixed relation, said second and fourth groups being axially movable to vary the equivalent focal length of the lens, said third group and said aperture defining means being stationary as the equivalent focal length of the lens is varied.

30. The lens of claim 29 where $$0.5 < K_1/K_G < 1.0$$

$$2.0 < K_2/K_G < 5.0$$

$$0.4 < K_3/K_G < 1.2$$

$$0.5 < K_4/K_G < 1.3$$

where $K_1$, $K_2$, $K_3$ and $K_4$ are the powers of said first, second, third and fourth groups respectively, and $K_G$ is the geometric mean of the powers of said lens at the extremes of its equivalent focal lengths.

31. A lens for a camera having a 24×36 mm image frame comprising from the object end, a first positive group, a second negative group, a third positive group, and a fourth positive group, said second and fourth groups being movable simultaneously in opposite directions to vary the equivalent focal length of said lens, said third lens group being stationary, an aperture defining means closely spaced to said third group and in fixed relation thereto, and $$0.015 > K_1 > 0.010$$

$$0.080 > |K_2| > 0.040$$

$$0.019 > K_3 > 0.010$$

$$0.023 > K_4 > 0.010$$

where $K_1$, $K_2$, $K_3$, and $K_4$, are the optical powers of said first, second, third, and fourth groups expressed as the reciprocal of the equivalent focal lengths in millimeters of said groups.

* * * * *

UNITED STATES PATENT AND TRADEMARK OFFICE
CERTIFICATE OF CORRECTION

PATENT NO. : 4,256,381

DATED : March 17, 1981

INVENTOR(S) : Melvyn H. Kreitzer

It is certified that error appears in the above-identified patent and that said Letters Patent are hereby corrected as shown below:

Please correct errors as listed below:

Column 1, line 26, "lenses a 135mm" should read --lenses at 135mm--

Column 2, line 40, "four Groups" should read --four groups--

Column 2, line 50, "infra" should read --infra--

Column 6, line 37, "iris I" should read --iris D--

Column 9, line 47, "TABLE" should read --TABLE VII--

Column 10, line 1, "TABLE-Continued" should read --TABLE VII-continued--

Column 13, line 13, Claim 10, "closely," should read --closely-- (delete comma)

Column 13, line 64, Claim 64, "and lens" should read --the lens--

Signed and Sealed this

Eighteenth Day of August 1981

[SEAL]

Attest:

GERALD J. MOSSINGHOFF

Attesting Officer    Commissioner of Patents and Trademarks